(12) United States Patent
Obara et al.

(10) Patent No.: US 7,113,628 B1
(45) Date of Patent: *Sep. 26, 2006

(54) DEFECT IMAGE CLASSIFYING METHOD AND APPARATUS AND A SEMICONDUCTOR DEVICE MANUFACTURING PROCESS BASED ON THE METHOD AND APPARATUS

(75) Inventors: Kenji Obara, Ebina (JP); Yuji Takagi, Kamakura (JP); Ryo Nakagaki, Kawasaki (JP); Yasuhiro Ozawa, Abiko (JP); Toshiei Kurosaki, Hitachinaka (JP); Seiji Isogai, Hitachinaka (JP)

(73) Assignee: Hitachi, Tokyo (JP)

( * ) Notice: Subject to any disclaimer, the term of this patent is extended or adjusted under 35 U.S.C. 154(b) by 560 days.

This patent is subject to a terminal disclaimer.

(21) Appl. No.: 09/716,077

(22) Filed: Nov. 17, 2000

(30) Foreign Application Priority Data

Nov. 29, 1999 (JP) ................................. 11-337196

(51) Int. Cl.
*G06K 9/00* (2006.01)
(52) U.S. Cl. ...................... 382/149; 702/35; 356/237.1
(58) Field of Classification Search ................ 382/147, 382/148, 149; 348/87, 126; 702/82, 35; 700/121, 110; 356/237.2, 237.3, 237.4, 237.5, 356/237.1; 250/559.2, 559.27, 559.36, 559.4, 250/559.41, 559.46
See application file for complete search history.

(56) References Cited

U.S. PATENT DOCUMENTS 5,801,965 A * 9/1998 Takagi et al. ................. 702/35

FOREIGN PATENT DOCUMENTS

JP 7-201946 * 8/1995

OTHER PUBLICATIONS

Paul J. Besl et al "Automatic Visual Solder Joint Inspection", IEEE Journal of Robotics and Automation, vol. RA-1, No. 1, pp. 42-56, 1985.*
Masakazu Ejiri et al., "Knowledge-Directed Inspection for Complex Multilayered Patterns," Machine Vision and Applications, (1989) 2:155-166.

* cited by examiner

*Primary Examiner*—Samir A. Ahmed
(74) *Attorney, Agent, or Firm*—Townsend and Townsend and Crew LLP

(57) ABSTRACT

According to the present invention, techniques including a method and apparatus for classifying and displaying images are provided. In an embodiment of the present invention a defect image classification method using inspected objects is provided. The method includes defect images obtained from at least one inspected object. Next a set of defect images is classified into a specified category, which has a feature. The defect images are arranged for display according to the feature and then displayed. The arranging of the defect images may also be based on an evaluation value for each defect image. Another embodiment provides a defect image classification method using inspected objects. Defect images are obtained from at least one inspected object. Next the defect images are classified into a plurality of categories and at least two information items for example, a defect distribution diagram showing locations of defects in the inspected object, information associated with a category of the plurality of categories, and a defect size distribution, are displayed.

3 Claims, 11 Drawing Sheets

(a) Phase of teaching data creation (b) Phase of automatic classification

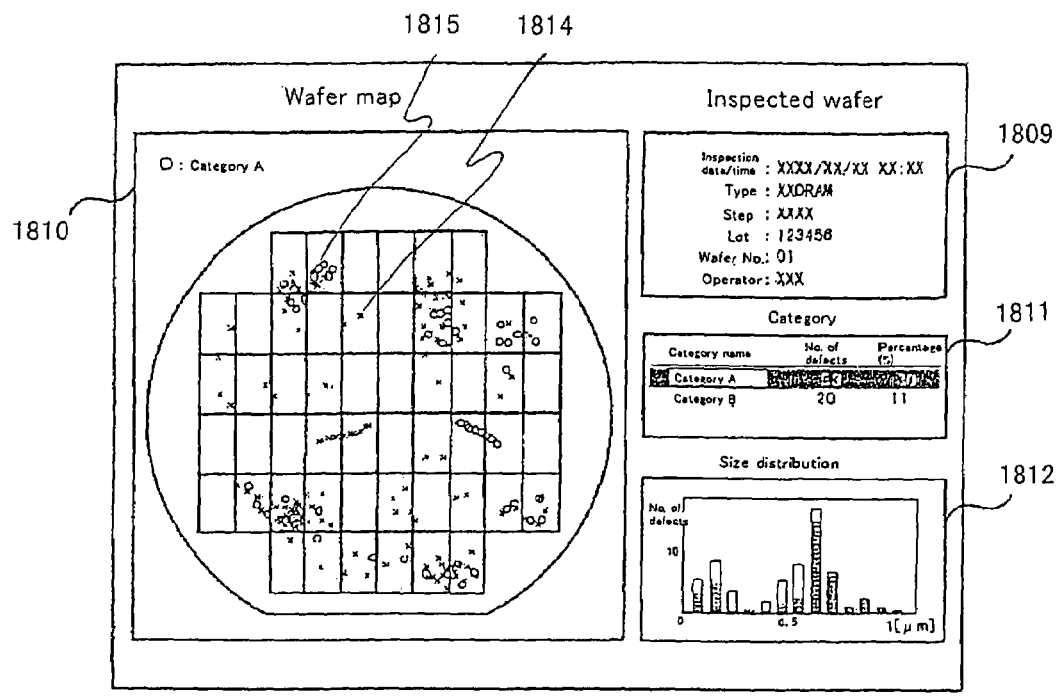

DEFECT IMAGE CLASSIFYING METHOD AND APPARATUS AND A SEMICONDUCTOR DEVICE MANUFACTURING PROCESS BASED ON THE METHOD AND APPARATUS

CROSS-REFERENCES TO RELATED APPLICATIONS

This application is related to and claims priority from Japanese Patent Application No. 11-337196 filed on Nov. 29, 1999.

This application is related to the following commonly assigned, non-provisional patent application, the disclosure of which is herein incorporated by reference in its entirety:

U.S. patent application Ser. No. 09/661,182 in the names of Kenji Obara, et. al. titled, "Method for Inspecting a Specimen and Apparatus for the Same," filed Sep. 13, 2000.

BACKGROUND OF THE INVENTION

This invention relates to a method and apparatus for classifying defect images obtained by imaging of contaminations or defects detected on semiconductor wafers and a semiconductor device manufacturing process based on the method and apparatus.

A semiconductor device is manufactured by making a wafer as a substrate go through several processing steps including exposure, development and etching. After a specific step among these processing steps is over, the locations and sizes of contaminations or defects on the wafer (hereinafter collectively referred to as "defects") are checked by a particle inspection system or a defect inspection system. Enlarged images of all or some of the contaminations or defects detected by this inspection are produced using a magnifying imaging device such as an optical microscope or SEM (Scanning Electron Microscope) to obtain detailed information on their size, shape and texture (surface pattern). This information has been used in order to identify the step which is the particle or defect source.

In recent years, a magnifying imaging system which incorporates a function to automatically produce enlarged images of contaminations or defects based on inspection result data obtained from the particle or defect inspection system, or ADR (Auto Defect Review), has been developed, which has made it possible to collect a huge volume of image data in a shorter time. However, as an increasing number of images are obtained, operating personnel must consume a greater amount of time and energy to analyze the images. In order to improve the working efficiency in such image analyses, a function to automatically classify the obtained defect images into categories according to their features, ADC (Auto Defect Classification), has been developed. Automatic classification of defect images using this function has contributed to improvement in analysis working efficiency by allowing operating personnel to analyze only defect images of a category to be noted or make an analysis paying attention only to the number of defects in each category.

A method to realize ADC has been disclosed in Japanese Published Unexamined Patent Application No. Hei 8-21803. In this method, a standard image for each defect category, called "teacher image data," is prepared and this data is used to execute a neural network learning session; then, for automatic classification, the data thus learned is used to decide to which category each input defect image should belong.

An example of a method to realize the function to automatically produce enlarged images of contaminations or defects based on inspection result data obtained from the particle or defect inspection system, or ADR, has been disclosed in Japanese Published Unexamined Patent Application No. Hei 9-139406 in which secondary electronic images from an electron microscope are used to observe contaminations or defects at optimum magnification ratios based on inspection result data obtained from the particle or defect inspection system.

However, in order to realize a system for auto defect classification as mentioned above, the user must teach the system the feature of each category by some means, whether a neural network as mentioned above is used or not, or whatever category judgment algorithm is used. In other words, it is necessary to teach the system the relationships between images and the categories they should belong to, for example, in the following ways: the user observes a defect image and decides to which category it should belong, or the user prepares data which describes the features of an image group which the user considers as belonging to a category. As the user handles more images to prepare higher quality teaching data, the user has to spend more time and energy in this work. Thus there is a need for an efficient way to provide the system with teaching data.

In addition, after teaching has occurred and automatic classification has been done, there still is the problem of effectively presenting the defect data to the user for analysis. Thus there is a need for an effective display of classified defect image data, so that the user may detect/evaluate the defects and, if needed, improve parts of the semiconductor device manufacturing process.

SUMMARY OF THE INVENTION

According to the present invention, techniques including a method and apparatus for classifying and displaying images are provided.

An object of one embodiment of this invention is to provide a defect image classifying method and apparatus capable of improving the teaching efficiency in automatically classifying defect images according to teaching data given in advance, as well as a semiconductor device manufacturing process based on the method and apparatus; that is to provide, in an embodiment, a defect image classifying method and apparatus in which teaching data required to classify huge volumes of image data concerning contaminations or defects obtained from the particle inspection system or defect inspection system can be created while saving the user time and labor, and a semiconductor device manufacturing process based on the method and apparatus.

An object of another embodiment of this invention is to provide a defect image classifying method and apparatus in which the result of automatic classification is presented to the user in a user-friendly manner, and a semiconductor device manufacturing process based on the method and apparatus.

According to one embodiment of this invention, defect images of objects of inspection, which have been produced by imaging of the objects, are classified into one or more categories. Next, the defect images are arranged and displayed on the screen in a manner to match the feature of a specified category of images.

In another embodiment of this invention, defect images of objects of inspection, which have been obtained by imaging of the objects, are classified into categories. Next, as a result of classifying defect images into categories, at least two among three types of information: a distribution diagram showing the locations of defects in the objects, information on the categories, and information on defect size distribution, are displayed on a display screen simultaneously, and if a distribution diagram appears on the screen, either the shape or color, or both, of points showing the locations of defects in the distribution (scatter) diagram, is varied depending on the category or defect size or their combination.

In yet another embodiment of this invention a defect image classification system for classifying defect images, produced from at least one object of inspection by imaging, into a plurality of categories, is provided. The system has software which includes: a feature calculating module to calculate features of the defect images; categorization module to specify a set of defect images to match a specified category; and evaluation module to calculate evaluation values of the defect images using the features of the defect images calculated by the feature calculating module and using the features of the set of defect images. In addition, a display unit with a screen is provided to show the defect images; and a sorting software module is provided to alter a display order of the defect images displayed by the display.

In a further embodiment of this invention, a semiconductor device manufacturing process is designed to include the following steps: a processed substrate which has undergone prescribed processing steps is inspected for contaminations or defects; images of contaminations or defects in this processed substrate are produced; these defect images are processed and classified into categories; a defect distribution for a category related to trouble in a specific processing step is monitored; and if the defect distribution is found abnormal by this monitoring, information to warn of the abnormality is outputted.

These and other embodiments of the present invention are described in more detail in conjunction with the text below and attached figures.

BRIEF DESCRIPTION OF THE DRAWINGS

FIG. 18 shows an example of a GUI screen showing the result of automatic classification of defect images according to an embodiment of this invention.

FIG. 19 shows an example of a GUI screen showing the result of automatic classification of defect images according to an embodiment of this invention.

DESCRIPTION OF THE SPECIFIC EMBODIMENTS

Embodiments of this invention are described next referring to the attached drawings.

Figure 1:
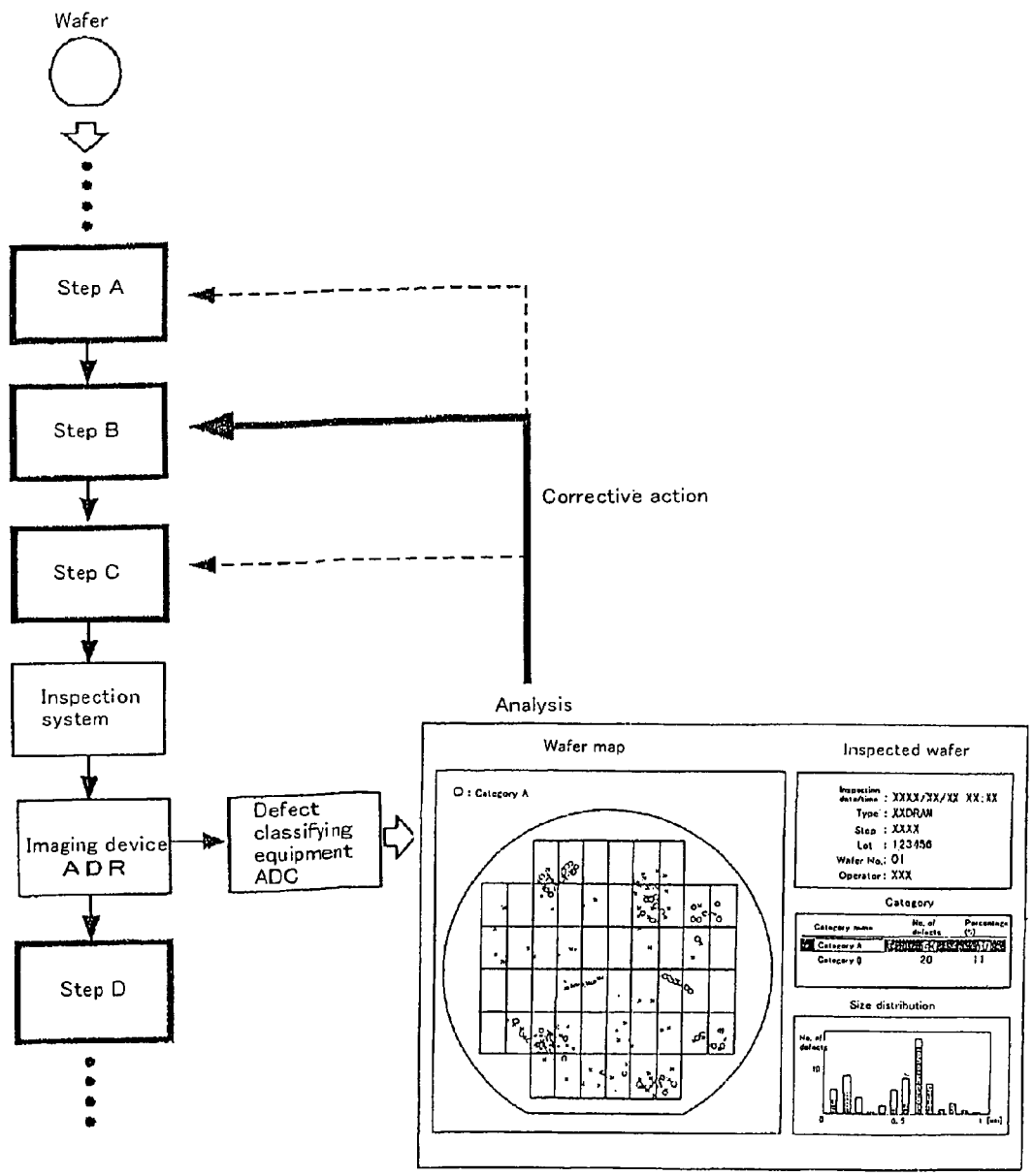
FIG. 1 is an explanatory view showing the role of defect image classifying apparatus according to an embodiment of this invention in the whole semiconductor manufacturing process.

FIG. 1 shows the role of defect image classifying apparatus according to an embodiment of this invention, in the whole semiconductor manufacturing process. For a wafer which has undergone one or more processing steps, a contamination/defect inspection is made using a defect inspection system such as model I-890 from Hitachi, Ltd. and ADR is performed using an imaging device such as an SEM; the image data obtained by ADR is sent to defect classifying apparatus where ADC takes place to classify defect images into categories. Next for illustration purposes, it is assumed that a preliminary analysis has revealed that defects of categories A, B, and C frequently occur in step A, step B, and step C, respectively. A defect distribution by category, which gives the locations of defects of, for example, category B may be generated. If the defect distribution is abnormal, trouble in step B is suspected and a warning is given to suggest that some corrective measures for step B should be taken. In other words, in comparison with a case in which no such defect classification is made and thus the whole process is judged normal or abnormal from a decrease or increase in the total number of defects, the introduction of a defect classification step as mentioned above would provide the user with more detailed information on defects. In addition, if a new type of defect which does not belong to any preset category is found, information on occurrence of a new type of trouble can be obtained. Also, information to help find the possible cause of processing step trouble can be given to the user by displaying defect distribution tendencies category by category or size by size.

Figure 2:
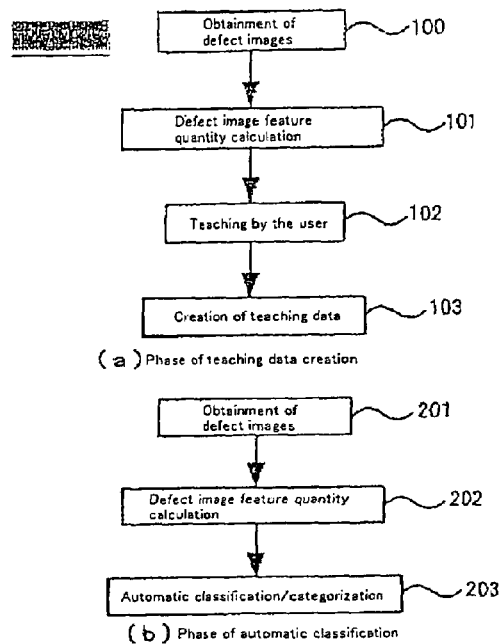
FIG. 2 is a flowchart showing the steps taken to classify defect images according to an embodiment of this invention.

FIG. 2 is a flowchart showing an example of a sequence for automatic classification by the defect image classifying apparatus according to an embodiment of this invention. The classifying apparatus performs two phases of operation: (a) creation of teaching data and (b) execution of automatic classification.

In (a) the phase of creation of teaching data consists of the following steps. First, as for a wafer whose defect positions are already known as a result of an inspection, defect images are obtained by an imaging device such as an optical microscope or SEM with the image pick-up position varying according to the defect location data (step 100). Features of the obtained images are calculated (step 101). Here, features refer to the size, brightness, color, shape, texture and so on of a defect. In order to calculate the features, a reference image which has the same background as the defect image but has no defect may also be produced (for example, a reference image with the same on-chip relative position or an image taken at a different imaging angle such as an overhead view).

Figure 3:
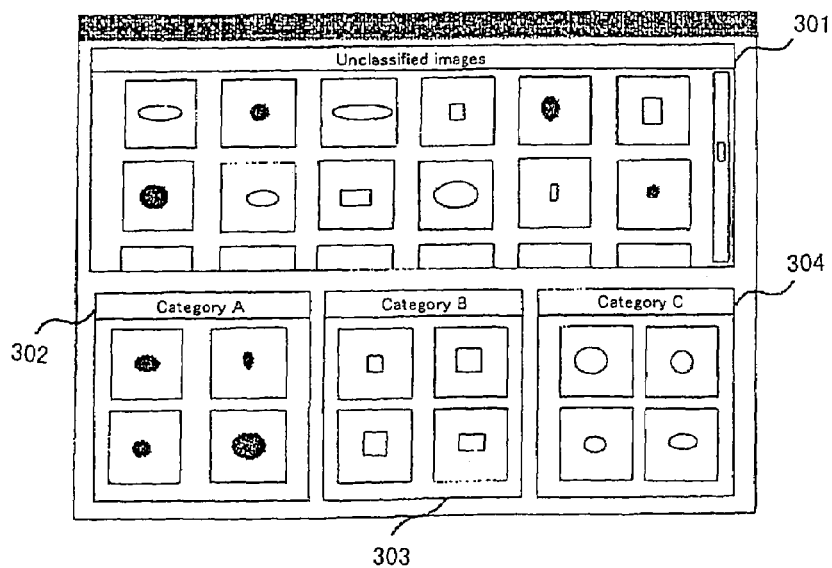
FIG. 3 shows an example of a GUI screen displaying defect images in classified form according to an embodiment of this invention.

The list of obtained defect images is shown to the user; then the user classifies images into categories to teach the system how to classify (step 102). FIG. 3A shows an example of Graphic User Interface (hereinafter referred to as GUI), which is displayed for the user during the teaching process, of one embodiment of the present invention. This GUI is composed of several windows. Window 301 is an unclassified defect image window showing defect images which the user has not classified yet. Windows 302, 303 and 304 show defect images classified into category A, category B and category C, respectively. The three category windows in this example, are for illustration purposes only; and the number of category windows is not limited.

Classification is done by manually moving defect images (data) in the unclassified image window into category windows. For instance, if the user moves a certain image from the unclassified image window 301 to the category A window 302, that image is classified as an image of category A.

Then, teaching data as basic information for classification is created to tell the system what feature of an image corresponds to which category (step 103).

In the phase of teaching data creation shown in the flowchart of FIG. 2, it is also possible to carry out step 101, in which image features are calculated, after teaching step 102, in which data is given to the automatic classification system. Also, it is not necessary to carry out this teaching data creation phase upon every imaging of a wafer to obtain a defect image (step 100); it should be carried out as needed.

In (b) the phase of automatic classification, as in (a) the phase of teaching data creation, as for a wafer whose defect positions are already known as a result of an inspection, defect images and reference images required for feature calculation are obtained by an imaging device such as an optical microscope or SEM with the image pick-up position varying according to the defect location data (step 201). Then, features for the image group are calculated (step 202). The calculated features are checked against the teaching data and categorization takes place using a classification algorithm such as a neural network and/or fuzzy inference (step 203).

Figure 3B:
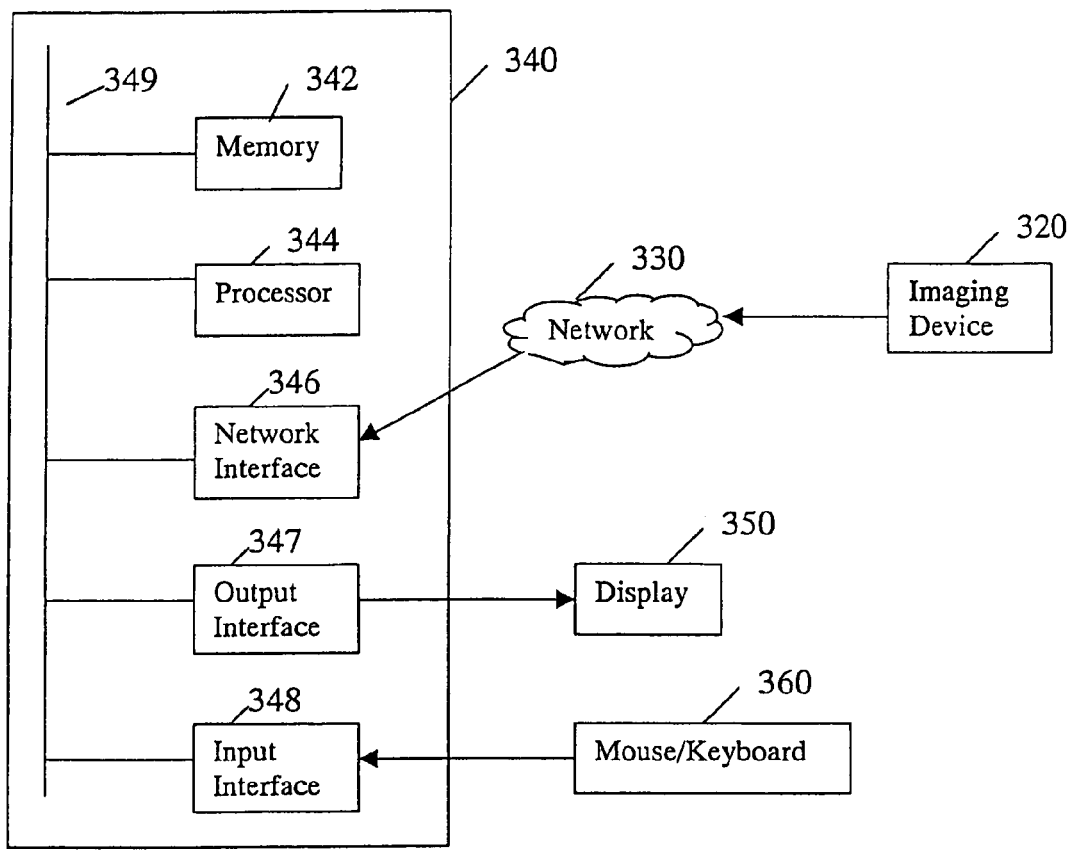

FIG. 3B illustrates a block diagram hardware description of one embodiment of the present invention. FIG. 3B shows an Imaging Device 320 coupled via a communications Network 330 to a Defect Image Classifying Apparatus 340. The Defect Image Classifying Apparatus 340 includes Memory 342, Processor 344, Network Interface 346, Output Interface 347, Input Interface 348, and Internal Bus 349, which couples the above components. The Network Interface component 346 couples the Apparatus 340 to the Network 330. A Display 350 is coupled to the Apparatus 340 via an Output Interface 347 and is used by Apparatus 340 to display the defect images and feature information of embodiments of the present invention to a user. The Input Interface 348 allows the user via Mouse and/or Keyboard 360 to enter information and selections into the Apparatus 340. The processor may be, for example an Intel Pentium microprocessor. The memory, includes both volatile and non-volatile memory and stores the software as described in FIGS. 2, 3A and other embodiments of the present invention.

Next, how images are categorized in the phase of teaching data creation according to an embodiment of this invention is explained.

Figure 4:
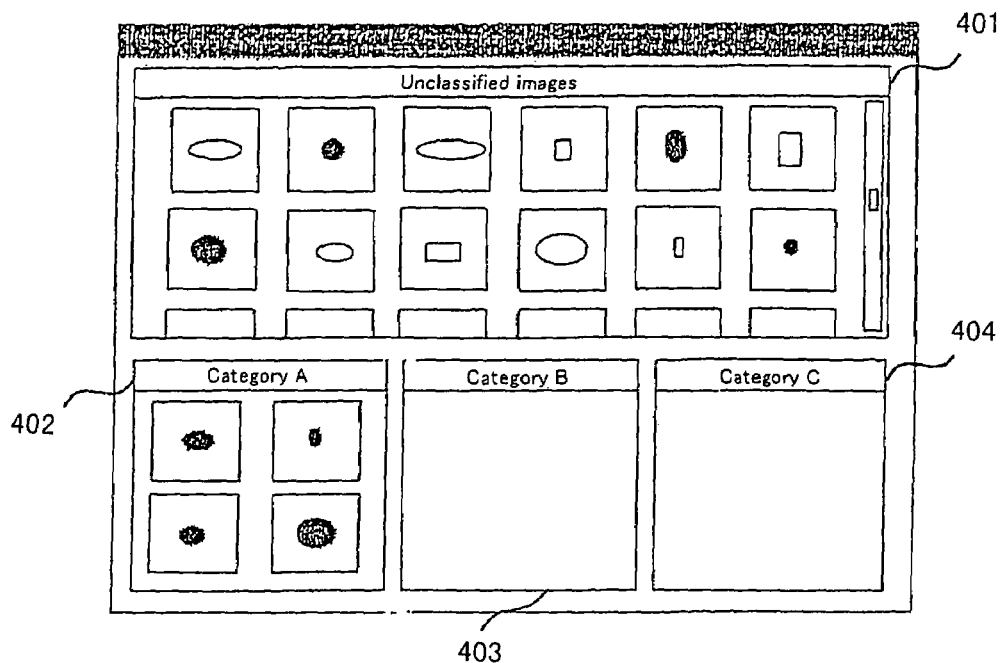
FIG. 4 shows an example of a GUI screen displaying defect images in classified form according to an embodiment of this invention.
Figure 5:
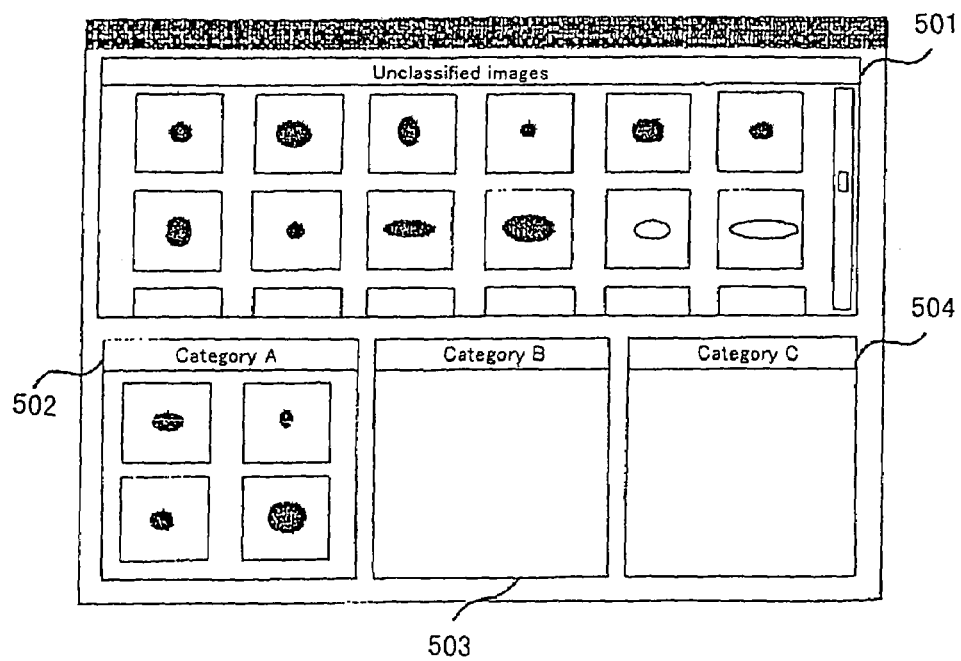
FIG. 5 shows an example of a GUI screen displaying defect images in the order of feature in classifying defect images according to an embodiment of this invention.

For example, as shown in FIG. 4 the user picks up one or more images which he or she considers as typical images of category A and moves them to the category A window 402. Then, upon some user action such as specifying the category A window 402 or pushing a button after specifying it or choosing from a menu, images in the unclassified image window 401 are rearranged according to the degree of similarity to the category A window 402. FIG. 5 shows the result of the re-arranged unclassified image window 501.

The degree of similarity is calculated, for example, by the following method.

Figure 6:
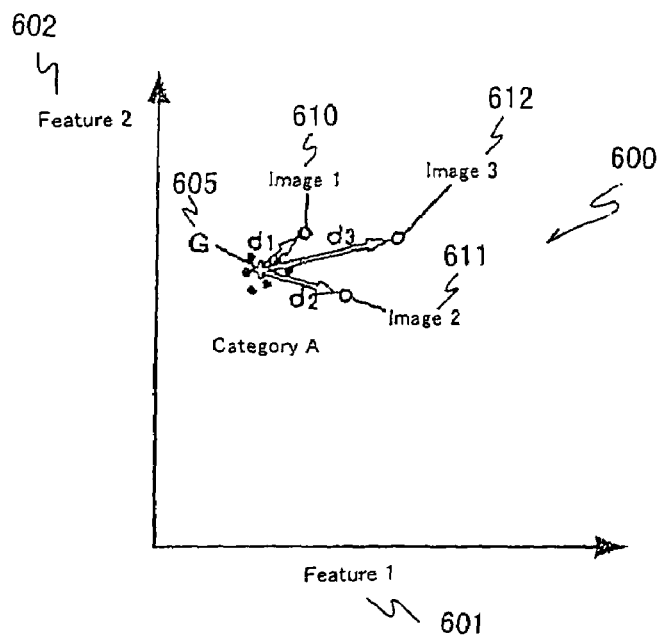
FIG. 6 shows an example of similarity calculation in an embodiment in classifying defect images according to an embodiment of this invention.

For each defect image, features for predetermined feature items such as defect size, brightness, color, and shape are calculated in advance. To simplify the explanation, it is assumed here that two features are used. Regarding defect images which the user has classified into category A, the position of each image is plotted in the feature space 600 defined by two features, feature 1 601 and feature 2 602, as indicated in FIG. 6. It is supposed that these images have similar features because the user has considered them as belonging to the same category. Hence, distribution of points plotted in the feature space 600 which represent the features of defect images is expected to have a certain tendency. Here, the center of gravity, G 605, in this distribution is calculated. For unclassified defect images, the calculated features of images 1 610, 2 611, and 3 612 are plotted in the same feature space 600 as shown in FIG. 6. Then, their distances d1, d2, d3 from the center of gravity G 605 are calculated; the shorter the distance is, the more similar the image is. Thus, the images are rearranged and redisplayed in the order of similarity.

This allows the user to pick up images to be classified into a category by examining only images with high degrees of similarity instead of all defect images of the group obtained as images for teaching, thereby improving the working efficiency in teaching data creation.

Here, as a method for specifying images whose attributes correspond to black dots as plotted in FIG. 6, it is not always necessary for GUI to provide a means to move images into category windows. If GUI allows the user to specify an image which he or she considers as belonging to the same category, it suffices. The display order of images in a category window may also be changed according to evaluations like the degree of similarity discussed above.

With the arrangements, in mapping in the feature space, it is possible to show the user which defect image is less coherent to the typical category features than the other images of the same category. The user can increase the feature coherence of teaching data by removing images which he or she judges atypical or inappropriate as teaching data.

Figure 7:
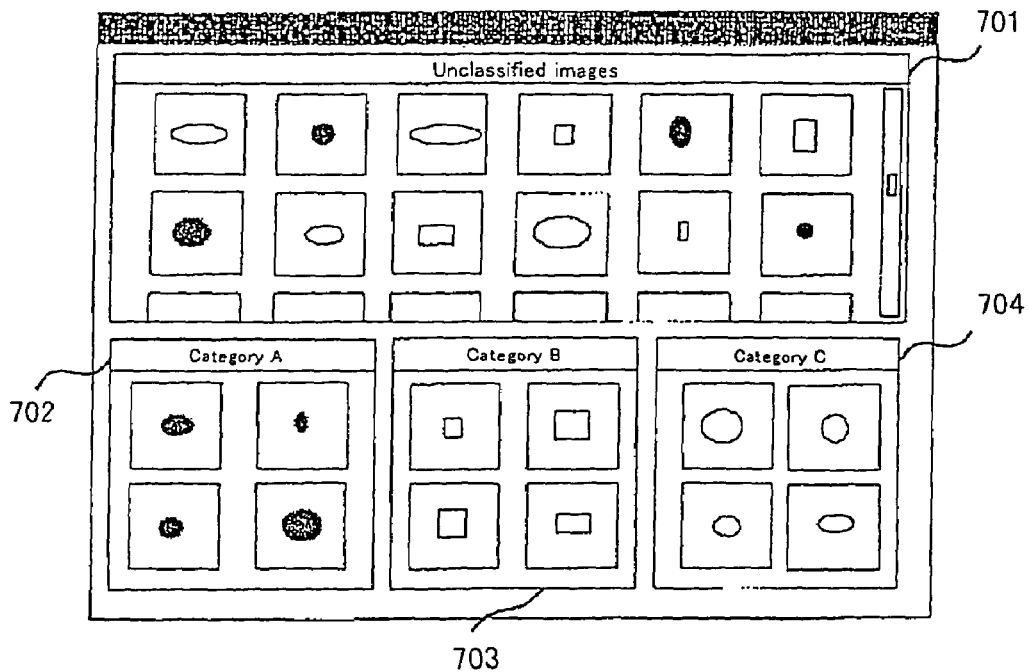
FIG. 7 shows an example of a GUI screen displaying defect images in classified form according to an embodiment of this invention.
Figure 8:
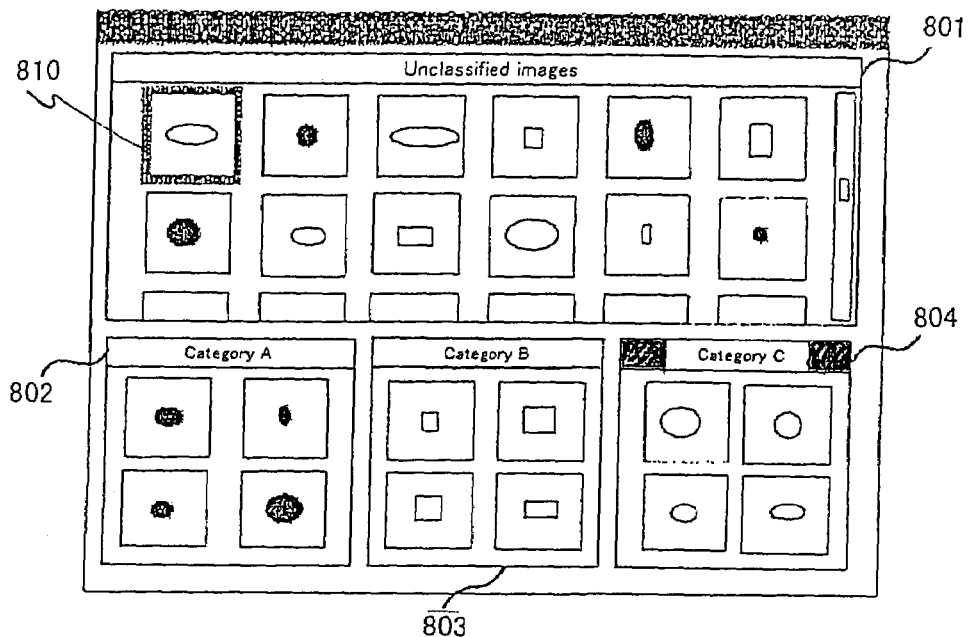
FIG. 8 shows an example of a GUI screen displaying defect images in classified form according to an embodiment of this invention.

Also, as shown in FIG. 7, user interface may be so designed that when each category window contains one or more images, for example 703, if an unclassified image 810 is chosen as shown in FIG. 8, the category representing features closest to the feature of the image may be made distinguishable from the other categories (in the case of FIG. 8, the title of category C 803 is hatched). The category closest in features can be determined as follows.

Figure 9:
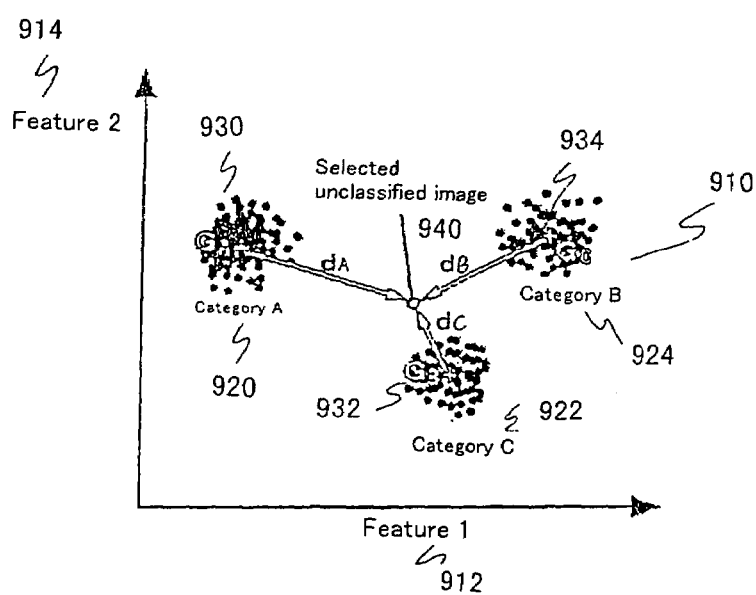
FIG. 9 shows an example of estimation of categories corresponding to defect images in classifying defect images according to an embodiment of this invention.

First, the quantities of predetermined features of the defect of each defect image (size, brightness, color, shape and so on) are calculated in advance. To simplify the explanation, it is assumed here that two features are used. Regarding the images which the user has classified into categories, the features of the images are plotted in the feature space 910 defined by two features, feature 1 912 and feature 2 914, in FIG. 9. This example assumes that the images are classified into three categories, A 920, B 922, and C 924. It is supposed that the images in each category are similar in their features because the user has considered them as belonging to the same category. Hence, distribution of points plotted in the feature space 910 which represent the features of defect images is expected to have a certain tendency. Here, the center of gravity in this distribution, GA 930, GB 932, or GC 934, is calculated for each category. Then, the features 940 of an image chosen from among the unclassified defect images are plotted in the feature space 910. Then, its distance dA, dB, or dC from the center of gravity for each category, GA 930, GB 932, or GC 934, is calculated. The category whose center of gravity is nearest to the plotted point representing the features 940 of the chosen image is suggested to the user.

In this way, the user is given a suggestion about a theoretically closest category before he or she classifies an image into a category, which saves the user time and labor in classification work.

Explained next is an embodiment of a display method to show the user correlations between images and their features in the phase of teaching data creation according to an embodiment of this invention.

Figure 10:
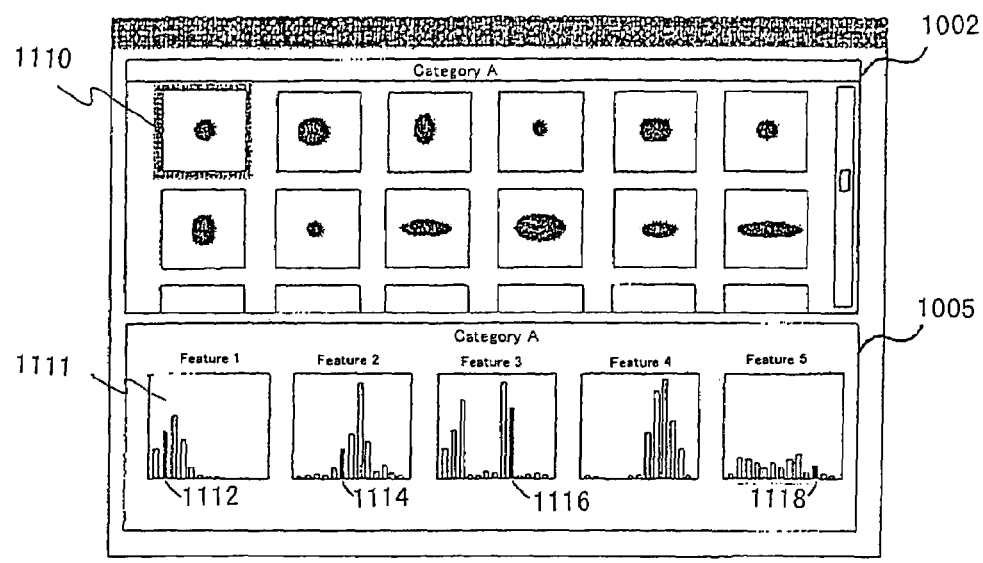
FIG. 10 shows an example of a GUI screen displaying defect images in association with features in classifying defect images according to an embodiment of this invention.

An embodiment of a display method according to this invention is shown in FIG. 10. Reference numeral 1002 represents a window which displays images as classified into category A and 1005 represents a feature distribution window which shows histograms indicating distributions of evaluation values of various features of images classified into category A.

Images and histograms are displayed simultaneously in this way, and if an image, for example 1110, is chosen in the category A window 1002, the bars in the histograms corresponding to the features of that image, for example, 1112, 1114, 1116, and 1118 are identified by color. As an example the window for feature 1 1111, may measure the value of brightness.

This tells the user where an image in a category is positioned in the feature distribution of the category. In short, the user can determine whether the feature of the chosen image is positioned around the center of the feature distribution of the category or in a marginal area or in a position atypical of the category; this provides the user with information to improve coherence in the features of the category by removing, from teaching data, an image which is atypical of the category.

Figure 11:
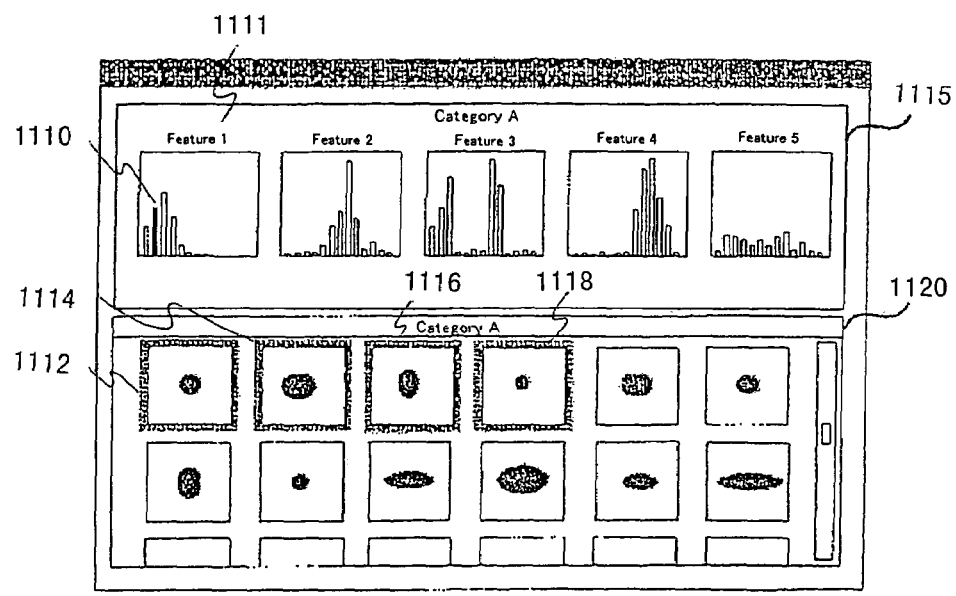
FIG. 11 shows an example of a GUI screen displaying defect images in association with features in classifying defect images according to an embodiment of this invention.

Conversely, as shown in FIG. 11, user interface may be arranged so that if the user chooses a bar, for example 1110, in a histogram 1111, in the feature distribution window 1115, the images, for example, 1112, 1114, 1116, and 1118, whose features corresponds to the chosen histogram bar 1110 are made distinguishable from the other images in the category A window 1120.

This enables the user to know which image is atypical of the category, from the feature distribution histogram; this provides the user with information to improve coherence in the features of the category, for example, by removing, from the teaching data, an image which is atypical of the category.

Figure 12:
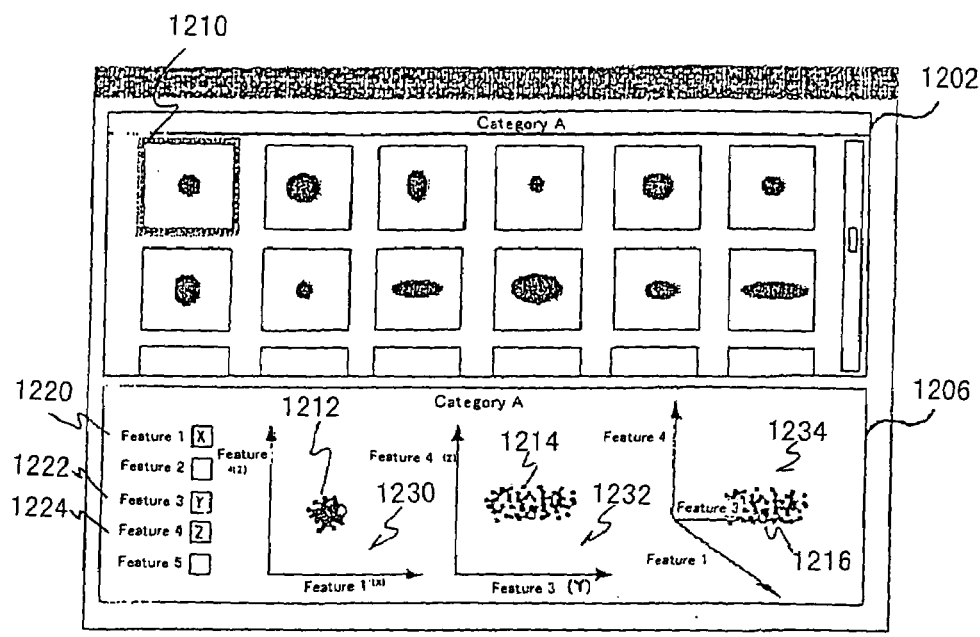
FIG. 12 shows an example of a GUI screen displaying defect images in association with features in classifying defect images according to an embodiment of this invention.
Figure 13:
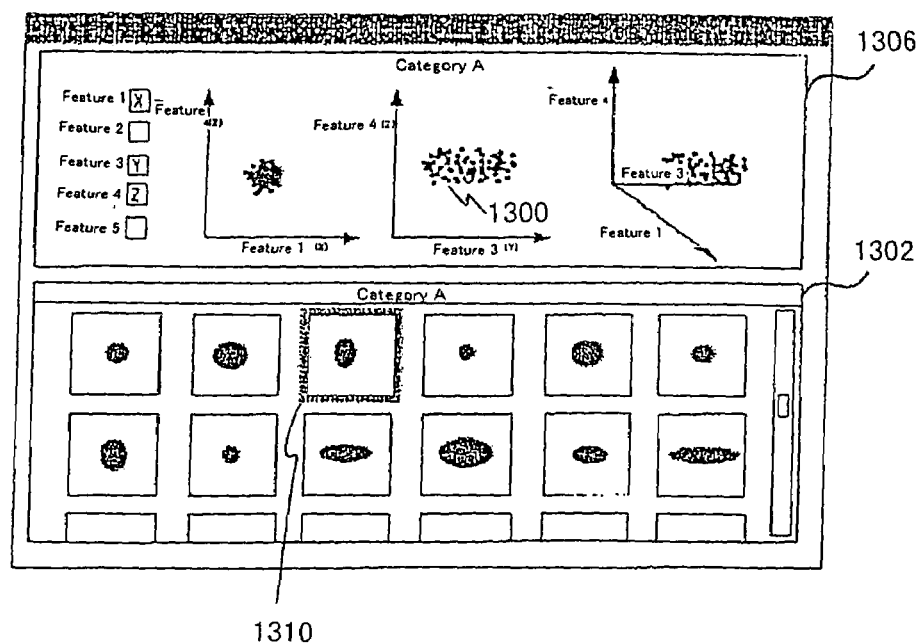
FIG. 13 shows an example of a GUI screen displaying defect images in association with features in classifying defect images according to an embodiment of this invention.

Feature distributions may be presented in the form of scatter diagrams in a feature scatter diagram window 1206 as shown in FIG. 12, instead of histograms. In this case, two or three features are selected and two-dimensional or three-dimensional feature spaces are generated; then scatter diagrams representing the features of a group of images related to a category are shown in the feature spaces. It is also possible to arrange that if an image, for example 1210, is chosen in the category A window 1202, the points, 1212, 1214, and 1216, corresponding to that image 1210 is made identifiable by color in the feature scatter diagrams window 1206. The user may select the axis for each feature. For example in window 1206, feature 1 has the x-axis selected 1220, feature 3 the Y-axis 1222, and feature 4 the Z-axis 1224. Two dimensional scatter diagram 1230 has feature 4 (Z-axis) versus feature 1 (X-axis). Two dimensional scatter diagram 1232 has feature 4 (Z-axis) versus feature 3 (Y-axis). Three dimensional scatter diagram 1234 has feature 4 (Z-axis) versus feature 1 (X-axis) and feature 3 (Y-axis). Note in this example, diagrams 1230 and 1232 are projections of diagram 1234.

Conversely, user interface may be arranged so that when a point, for example 1300 in a feature space is chosen in the feature scatter diagram window 1306, the image 1310 whose features correspond to that point 1300 can be identified in the category A window 1302.

Described next is how the sizes of defects as evaluation values are classified into groups and categorization in each group takes place according to an embodiment of this invention.

What feature items can be used in the user's evaluation of a defect depends on the size of the defect. For instance, if the defect is too small, it is difficult for the user to evaluate it with regard to shape ("round," "square" and so on).

Also, when the texture of the area of the defect is to be evaluated, if the defect is too small, the influence of noise may be increased because of the smallness of the area to be analyzed, thus resulting in a failure in correct texture evaluation. If the texture evaluation data thus taken is used as teaching data, coherence in the features of each category may deteriorate.

For these reasons, images are divided into two or more defect size groups and categorization takes place in each size group.

Switching from one size group to another is possible and the user can observe the desired size group. Assuming that images are divided into two defect size groups, an example of a larger defect group is shown in FIG. 14 and one of a smaller defect group is shown in FIG. 15.

Figure 14:
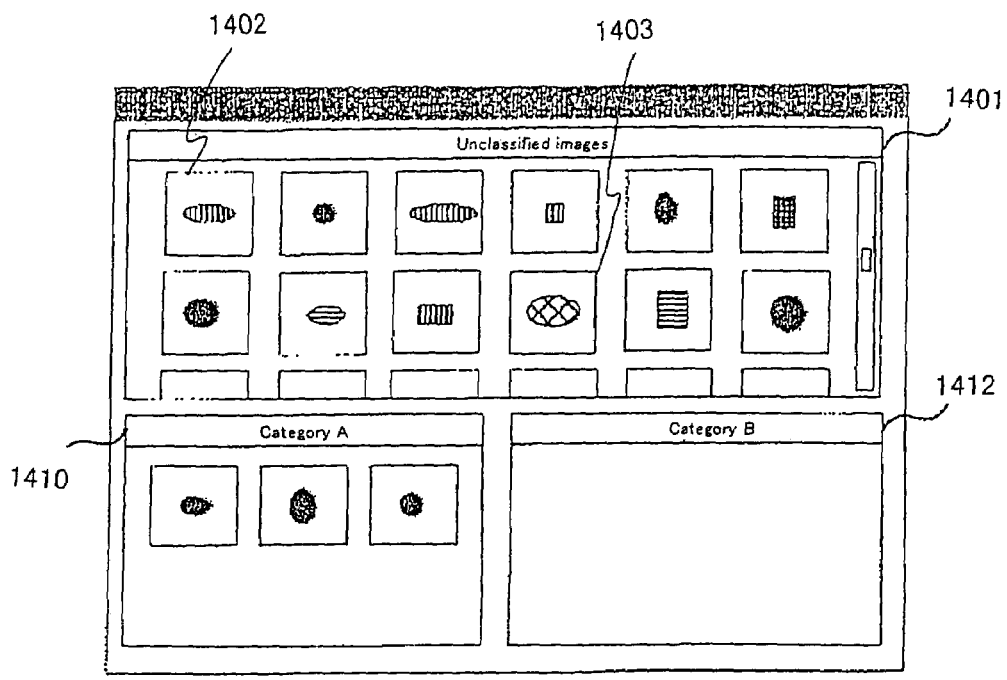
FIG. 14 shows an example of a GUI screen displaying defect images as divided into groups by size in classifying defect images according to an embodiment of this invention.
Figure 15:
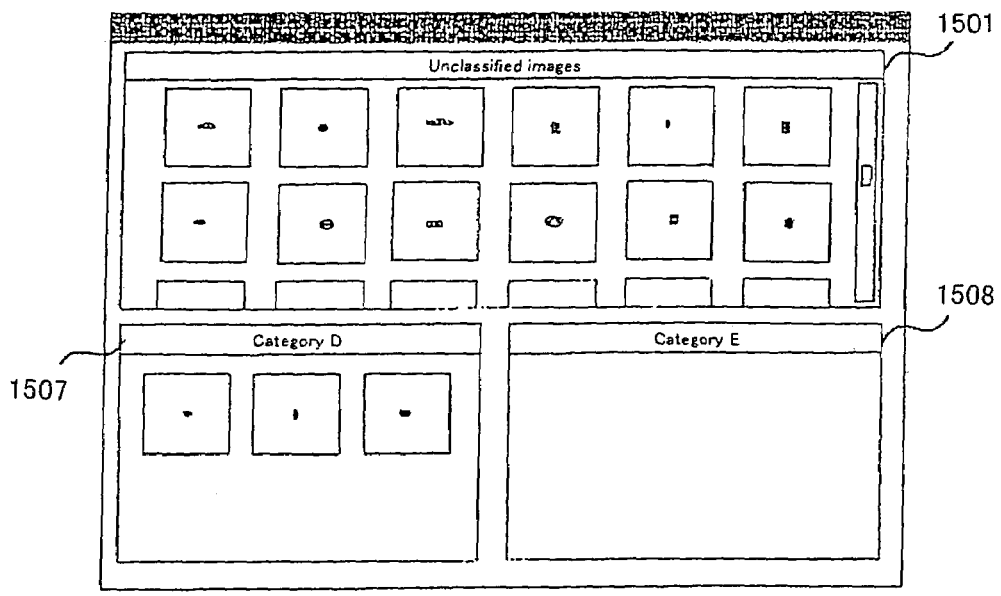
FIG. 15 shows an example of a GUI screen displaying defect images as divided into groups by size in classifying defect images according to an embodiment of this invention.

For the larger defect size group, categories related to texture details (e.g. "coarse" or "angular" texture, illustrated by images, e.g., 1402 and 1403, in window 1401 of FIG. 14) are added, while for the smaller defect size group, new category windows, for example, 1507 and 1508 in FIG. 15 (for features such as "bright" and "dark") that are not used for the larger size group are provided to classify defects in a simpler manner than for the larger size group. This means that teaching data is separately prepared for the larger and smaller defect size groups. Before starting automatic classification of images, which teaching data should be used is determined depending on the defect size; therefore, classification takes place using the more suitable teaching data.

This reduces the influence of noise caused by the smallness of a defect area, improves coherence in features for each category, and thus increases the accuracy of automatic classification. Since images are to be divided into defect size groups without using teaching data prepared by the user, the user need not prepare teaching data for different categories for different size groups, thereby leading to improvement in teaching efficiency.

The number of category windows as mentioned above is not limited; FIGS. 14 and 15 each show two category windows for illustration purposes only.

Explained next is how images are displayed when the magnification ratio in imaging is changed, according to an embodiment of this invention.

Figure 16:
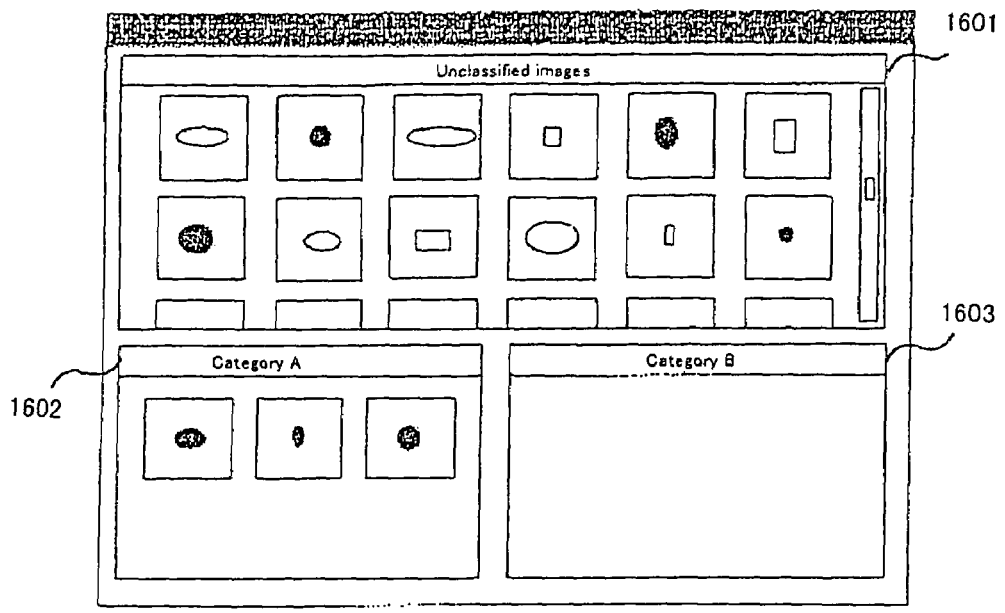
FIG. 16 shows an example of a GUI screen displaying defect images in classified form according to an embodiment of this invention.

If images with different defect sizes are shot at a single magnification ratio, some of the obtained images may have the problem that the defect image overflows the visual field or it is too small to observe properly. There are a few ways to solve the problem: the magnification ratio is varied freely according to defect size information obtained from an inspection system or defect size information based on calculation from defect images produced by the imaging device; or several magnification ratios are preset to suit different defect sizes and the imaging magnification ratio is changed step by step according to the defect size so that defect images of a virtually uniform size are produced regardless of defect size. However, when images have been produced using different magnification ratios in this way, it is difficult for the user to properly compare the sizes of the defects in a defect image window as shown in FIG. 16 because the images are equal in size though the defects are enlarged at different ratios, for example, the images in the category A window 1602.

Figure 17:
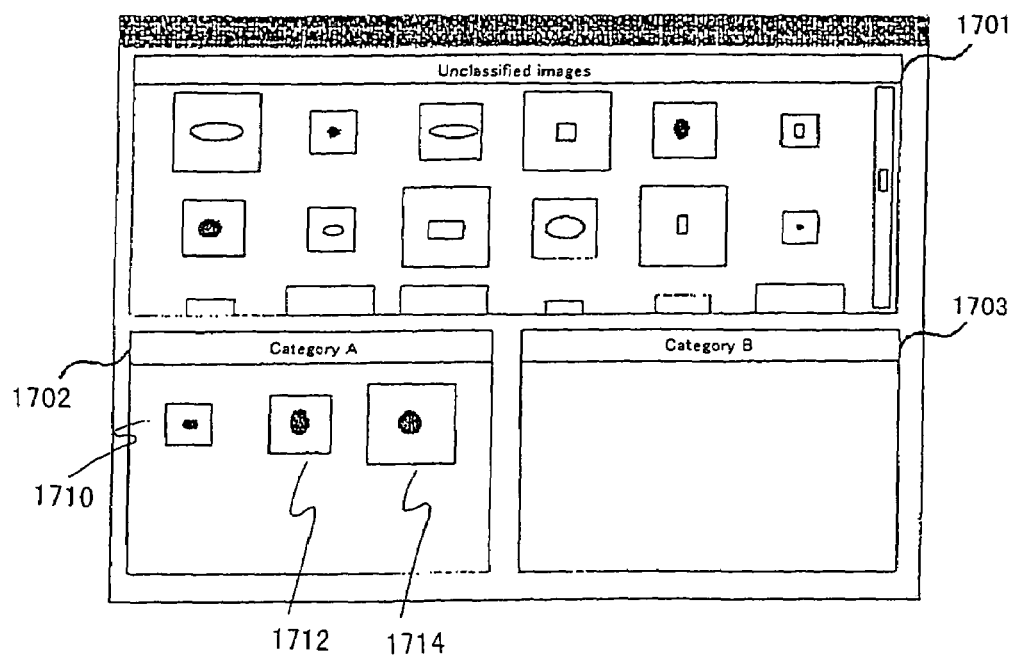
FIG. 17 shows an example of a GUI screen displaying defect images whose sizes vary depending on the imaging magnification ratio, in classifying defect images according to an embodiment of this invention.

As a solution, the image size is varied in inverse proportion to the magnification ratio used for imaging as shown in FIG. 17 so that they are displayed to an equal scale, for example, the images in the category A window 1702 were image 1710 is small compared to image 1714. This makes it easy for the operator to compare the sizes of defects whose images have been produced using different magnification ratios. To avoid mistaking defect sizes because of display image size difference, dummy data may be added to the contours of images whose sizes are reduced, so that the displayed images (contours) appear to be equal in size.

Explained next are examples of how the result of automatic classification is shown to the user according to an embodiment of this invention.

FIGS. 18 and 19 show examples of screens showing the results of automatic classification. Each screen has the following windows: a wafer window 1809 which shows information on the inspected wafer including the wafer type and inspection date/time; a wafer map window 1810 which shows the defect distribution, i.e., locations of defects detected on the wafer; a category window 1811 which indicates the names of the categories into which the defects on the wafer have been classified, and information on breakdown of defects; and a size distribution window 1812 which shows a histogram of defect size distribution. On the screen containing these windows, when the user chooses one of the categories listed in the category window 1811, plotted points on the wafer map window 1810 representing the defects corresponding to the chosen category are made distinguishable from the other points by color or shape, for example 1815 have a "O" and 1816 having an "X". In the size distribution window 1812, a histogram of size distribution for the chosen category in the category window 1811 is shown (in this case category A). The histogram of size distribution for the chosen category may be displayed in either of the following ways: it is laid over the histogram of size distribution for all the defects, or the histogram for all defects is switched to the one for the chosen category. In an alternative embodiment, the user can choose two or more categories at a time.

Further, as shown in FIG. 19, when the desired size range is selected in the size distribution window 1912, for example, horizontal range 1915 to 1919, the points on the wafer map in the wafer map window 1910 corresponding to defects of the selected size range are made identifiable by color or shape.

In another embodiment the identifiable points on the wafer map in the wafer map window 1910, representing the defect distribution, are narrowed down according to both category and size information. Thus a filtered defect distribution is displayed, were the filtering is by category and size. For example, if one category is chosen in the category window 1911, the size or shape of points corresponding to the category changes; if a defect size range is selected in the size distribution window 1912, points corresponding to only the selected size range among the ones whose sizes or shapes have once changed, change their color or shape again. In an alternative embodiment, among points representing defects of the same category, only those not corresponding to the selected size range may be made identifiable by color or shape.

In other embodiments, the size distribution may be expressed not only as a histogram but in terms of cumulative frequencies or in the form of a table showing quantities.

In an embodiment, if a certain area in the wafer map is specified, concerning the defects within the specified area, the total number of defects, the number of defects and percentage of each category, and size distribution are displayed.

In addition, it is not necessary to simultaneously display all the three types of information the wafer map, category listing and defect size distribution. It is sufficient to display at least two types of information out of the three simultaneously.

Besides, any of the three types of information need not be continually displayed. It is acceptable that they are usually not displayed but can be called to the screen by the user as necessary.

The above-mentioned arrangements will help the user grasp the tendency of distribution of defects of each category on the wafer map, thus providing the user with useful information to find the cause of occurrence of defects.

Though not shown graphically here, another embodiment provides simultaneously or successively displaying wafer maps concerning wafers from different production lots or wafer maps concerning different processing steps for the same wafer, so that the user can easily grasp how the condition of occurrence of contaminations of each category changes between lots or steps.

As mentioned above, when the conditions of occurrence of contaminations of each category concerning different wafer lots or different processing steps for the same wafer are simultaneously or successively displayed as wafer maps, the user can monitor the condition of occurrence of contaminations of each category between lots or steps. This implies that the semiconductor manufacturing system can be properly serviced according to the condition of occurrence of contaminations of each category so that semiconductor devices can be efficiently produced with an improved yield rate in processing of wafers.

As discussed above, one advantage of one embodiment of this invention is to save the user time and labor in creating teaching data because selection of similar defect images or displaying of an appropriate category based on similarity is automatically performed in advance and the user need not classify all images into categories in order to create teaching data.

Another advantage of an embodiment of the invention is that since a diagram prepared according to the feature distribution of a defect image group is displayed in association with defect images within the group, it is easy to determine whether the feature of a certain defect image is typical or atypical of the category specified by the user. Also, which image is atypical of the category specified by the user can be indicated by displaying the feature distribution for the category. Therefore, the user can easily remove atypical images from the teaching data, so higher quality teaching data with higher coherence in features can be created.

A further advantage of another embodiment of the invention is that since defect images are divided into two or more groups by defect size and categorization is made within each group, the user need not give teaching data for classification by size and the influence on the feature of noise caused by the smallness of a defect size can be reduced, thereby permitting automatic classification with higher accuracy.

Another advantage of an embodiment of the invention is that the image display size is varied depending on the imaging magnification ratio so that images are displayed to an equal scale, so the user can easily compare defect sizes relatively for teaching data creation.

A further advantage of an embodiment of the invention is that since it is possible to plot the condition of defect distribution on the wafer map according to the category or defect size, or both, the user can easily grasp the relations among categories, sizes and defect locations and effectively provide information for feedback to the processing steps.

A still further advantage of the invention is that since the user can monitor the condition of occurrence of defects classified into a specific category using teaching data, he or she can easily determine the timing to service the system to correct the cause of defects of that category, leading to higher wafer yield rates in manufacture of semiconductor devices.

Although the above functionality has generally been described in terms of specific hardware and software, it would be recognized that the invention has a much broader range of applicability. For example, the software functionality can be further combined or even separated. Similarly, the hardware functionality can be further combined, or even separated. The software functionality can be implemented in terms of hardware or a combination of hardware and software. Similarly, the hardware functionality can be implemented in software or a combination of hardware and software. Any number of different combinations can occur depending upon the application.

Many modifications and variations of the present invention are possible in light of the above teachings. Therefore, it is to be understood that within the scope of the appended claims, the invention may be practiced otherwise than as specifically described.

The preceding has been a description of the preferred embodiment of the invention. It will be appreciated that deviations and modifications can be made without departing from the scope of the invention, which is defined by the appended claims.

What is claimed is:

1. A computer memory storing code for a defect image classification method using inspected objects, said computer memory comprising:
    code for obtaining defect images from at least one inspected object;
    code for extracting features from each of the defect images;
    code for displaying on a screen a plurality of first defect images together in side-by-side fashion, wherein the first defect images are unclassified;
    code for displaying a plurality of second defect images on the screen, wherein the second defect images belong to one of classified defect categories; and
    code for rearranging some of the plurality of the first defect images in the order of similarity to the second defect images.

2. A defect image classification method using inspected objects, said method comprising:
    obtaining defect images from at least one inspected object;
    extracting features from each of the defect images;
    displaying on a screen a plurality of first defect images together in side-by-side fashion, wherein the first defect images are unclassified;
    displaying a plurality of second defect images on the screen, wherein the second defect images belong to one of classified defect categories; and
    rearranging some of the plurality of the first defect images in the order of similarity to the second defect images.

3. The defect image classification method of claim 2, wherein the defect images are displayed to substantially an equal scale.

* * * * *